United States Patent [19]
Engelbrecht et al.

[11] Patent Number: 5,510,801
[45] Date of Patent: Apr. 23, 1996

[54] LOCATION DETERMINATION SYSTEM AND METHOD USING TELEVISION BROADCAST SIGNALS

[75] Inventors: Lloyd Engelbrecht, Reston, Va.; Aaron Weinberg, Potomac, Md.

[73] Assignee: Stanford Telecommunications, Inc., Reston, Va.

[21] Appl. No.: 203,257

[22] Filed: Mar. 1, 1994

[51] Int. Cl.$^6$ ..................................................... G01S 3/02
[52] U.S. Cl. ........................... 342/457; 342/463; 342/357
[58] Field of Search .................................. 342/457, 463, 342/453, 394, 357

[56] References Cited

U.S. PATENT DOCUMENTS

| | | |
|---|---|---|
| 3,303,502 | 2/1967 | Mahoney . |
| 3,518,674 | 6/1970 | Moorehead et al. ................... 343/112 |
| 3,747,106 | 7/1973 | Dalabakis et al. . |
| 3,774,211 | 11/1973 | Nard et al. . |
| 3,774,215 | 11/1973 | Reed . |
| 3,889,264 | 6/1975 | Fletcher . |
| 3,899,740 | 8/1975 | Unkauf et al. . |
| 4,543,580 | 9/1985 | Bent et al. ............................... 343/460 |
| 4,555,707 | 11/1985 | Connelly ................................. 343/387 |
| 4,651,156 | 3/1987 | Martinez . |
| 5,045,861 | 9/1991 | Duffett-Smith . |
| 5,173,710 | 12/1992 | Kelley et al. . |
| 5,276,451 | 1/1994 | Odagawa ................................ 342/357 |

*Primary Examiner*—Thomas H. Tarcza
*Assistant Examiner*—Dao L. Pham
*Attorney, Agent, or Firm*—Jim Zegeer

[57] ABSTRACT

A location determination system and method in which mobile receiver units are in an area of at least three fixed commercial television stations, each television station broadcasting standard television signals, including horizontal, vertical and chrominance burst synchronizing signals. The standard television signals from selected ones of said television station are received at the mobile receiver unit and the times of arrival synchronizing signals of the selected ones of the television stations, respectively, are measured to produce mobile receiver unit signals corresponding thereto. A fixed reference station receives the television signals and detects any frequency and wavelength drift in the standard television signals from each of the fixed commercial television stations, respectively, and produces reference receiver correction signals. A processor, which may be at the reference station or at the mobile receiver units, computes the location of the mobile receiver units from the mobile receiver unit signals and the reference receiver correction signals.

11 Claims, 6 Drawing Sheets

LOCATION DETERMINATION SYSTEM AND METHOD USING TELEVISION BROADCAST SIGNALS

BACKGROUND AND BRIEF DESCRIPTION OF THE INVENTION

Global Positioning Systems (GPS) are based on satellite range measurements. In the urban Canyon and dense forest-type environments, due to high buildings, trees, and multipath effects, there can be gaps in position determination. In application Ser. No. 08/115,087 an AM positioning system, based on range measurements using commercial AM radio broadcast stations, is used to provide a No-Gap positioning system. Both Am and FM (pilot tones or subcarrier) positioning systems using plural commercial broadcast radio stations are well known in the art. In contrast, the present invention is directed to a position or location determination system using conventional commercial television (TV) broadcast signals.

Television (TV) broadcast stations utilize a signal transmission format that permits the extraction of timing information from the signals and, utilizing the velocity of radio wave propagation, convert this timing information into distance information. With a sufficient number of measurements, each measurement made employing a signal from a television station located at a different location than the other stations, a geometric location solution can be made.

Television (TV) station signal utilization for location determination has numerous advantages which include:

a. Very high power is usually employed in metropolitan areas to insure good program coverage. The location system can therefore operate over the wide area covered by TV. Because of the frequency band of operation of the stations, substantial building penetration is also achieved by the signals. Because of the combination of high power and frequency of operation, the position or location determination system can operate within many structures (buildings, public structures, businesses, busses, trains, etc.) in the station coverage area. This is a distinct advantage over such systems as GPS, LORAN, OMEGA, and TRANSIT. For areas where there may be insufficient TV broadcast stations to provide location information, the invention may optionally incorporate a GPS location system and a logic circuit to select the most reliable of the location signals for use.

b. Very high power is usually employed by TV stations in metropolitan areas to deliver a quality picture and sound presentation to the user. Because these signals vary from instant to instant, are low in repetitive information content, and require high bandwidth at the receiver, high power is necessary to achieve coverage for the majority of the metropolitan population. The location system according to this invention uses the repetitive information (not the variable information) requiring a low bandwidth. Signals marginal for video purposes can be extremely useful for location purposes.

c. The signal format utilized by the television stations is uniform (specified by the FCC) permitting uniform measurement equipment and approaches in the U.S. The location measurement approach can in fact utilize technology employed in current portable TV receivers for the extraction of timing signals permitting a low cost receiver.

d. The signal format utilized by the TV stations is highly stable and accurate, permitting simple differential implementation of the location determination process. (If the signal formats were not stable and accurate, synchronized timing signals could be utilized to achieve location determination.)

BRIEF DESCRIPTION OF THE DRAWINGS

The above and other objects, advantages and features of the invention will become more apparent when considered with the following specification and accompanying drawings wherein.

DETAILED DESCRIPTION OF THE INVENTION

Figure 1:
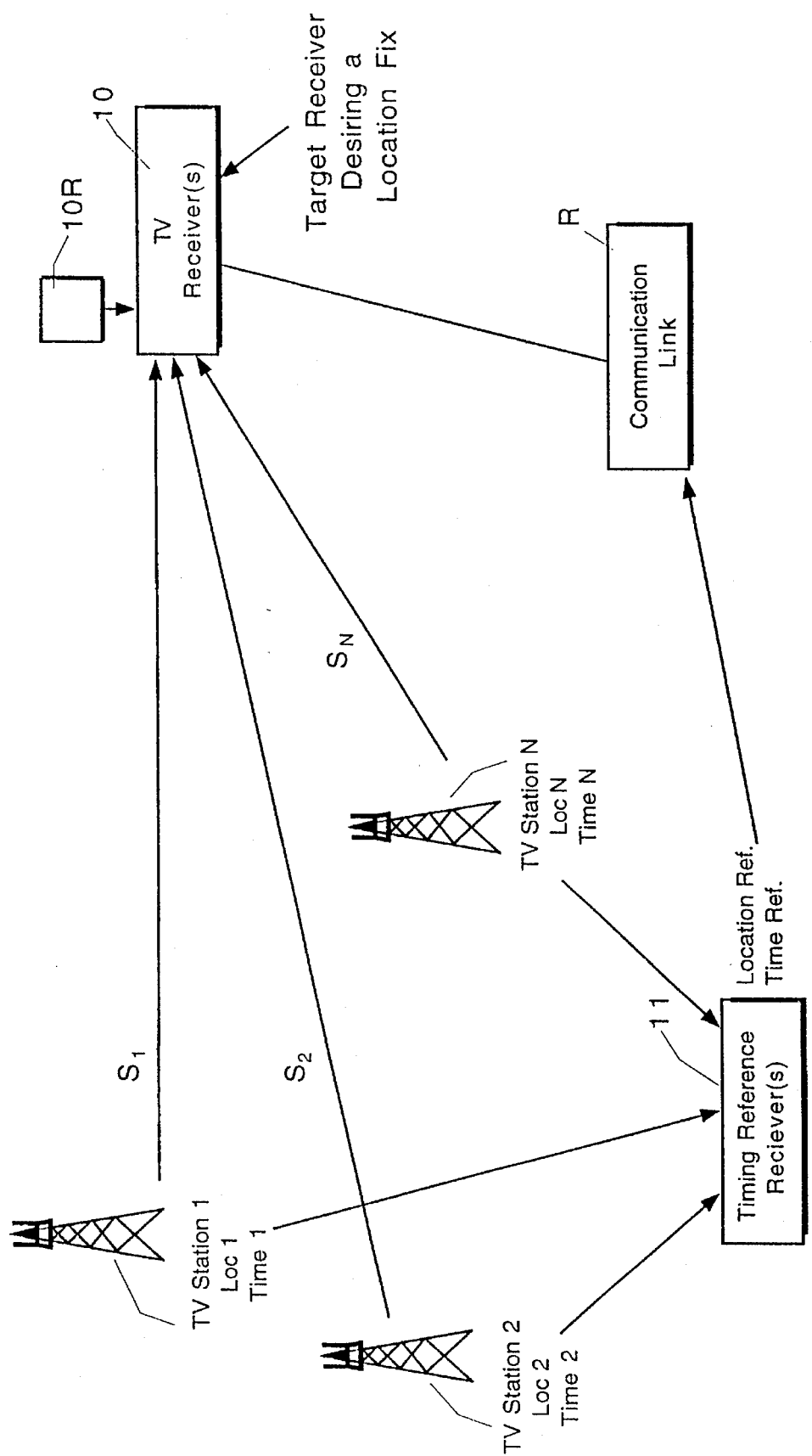
FIG. 1 is a schematic diagram of a positioning system using TV signal location determination according to the invention.

FIG. 1 describes the basic elements of a TV Location Determination System incorporating the invention. Multiple television stations TV Station 1, TV Station 2 . . . TV Station N are utilized in the approach. Each TV station employed must be at a different geographical location LOC 1, LOC 2 . . . LOC N than the others. Wide separations in distance provide the potential for higher location determination accuracy. It is further required that the stations' geographic locations be accurately known since the station position also affects the location determination precision. A minimum of three (3) TV stations must be utilized to determine a two dimensional (2D) location solution applicable to most terrestrial applications. (A 3D solution is achievable if a minimum of 4 stations are used and one of the stations is at a substantially different elevation than the others.) For the 2D solution, more than 3 stations can be utilized to 1) provide solutions where one or more TV signals may be unacceptable due to blockage, multipath, etc., and 2) provide improved accuracy because of the multiplicity of signals contributing to the solution.

The signals transmitted (FIG. 1) are received by both the mobile receiver units 10 desiring the location determination or fix (Target Receiver 10) and Reference Receiver 11. The Reference Receiver's 11 position must also be accurately known. The functions of the Reference Receiver 11 are 1) to measure the time difference of arrival of a reference portion of each station's signal, 2) to measure the rate of change of the time difference of arrival, and 3) to provide these data (or a processed version of the data) to the mobile receiver units 10 desiring location determination. These data are required because the TV stations derive all their timing related signal structure from a 3.579545 MHz reference that is accurate to within 10 Hz and stable to within $\frac{1}{10}$ Hz/sec (FCC requirement). These two characteristics make the timing signals appear to "drift" relative to each other, and, without knowledge of their timing offset and offset change, the location solution would "drift". The Reference Receiver 11 provides the necessary reference receiver correction data to achieve a stable location solution. Therefore, to make this data available to the receiver desiring location determination, there must be a communication link 12 to connect the source of the reference receiver correction data and the measurement data to the mobile receiver units 10.

The mobile receiver units 10 desiring location determination (designated as the "Target" Receiver) receives the TV stations' signals, and measures the time-of-arrival of these signals. The time of arrival can be made relative to the Target Receiver's 10 own internal reference 10R or can be made relative to a received TV station signal. In the latter case, processing is simplified, especially if the Target Receiver reference station is the same as the Reference Receiver's reference station.

Figure 2:
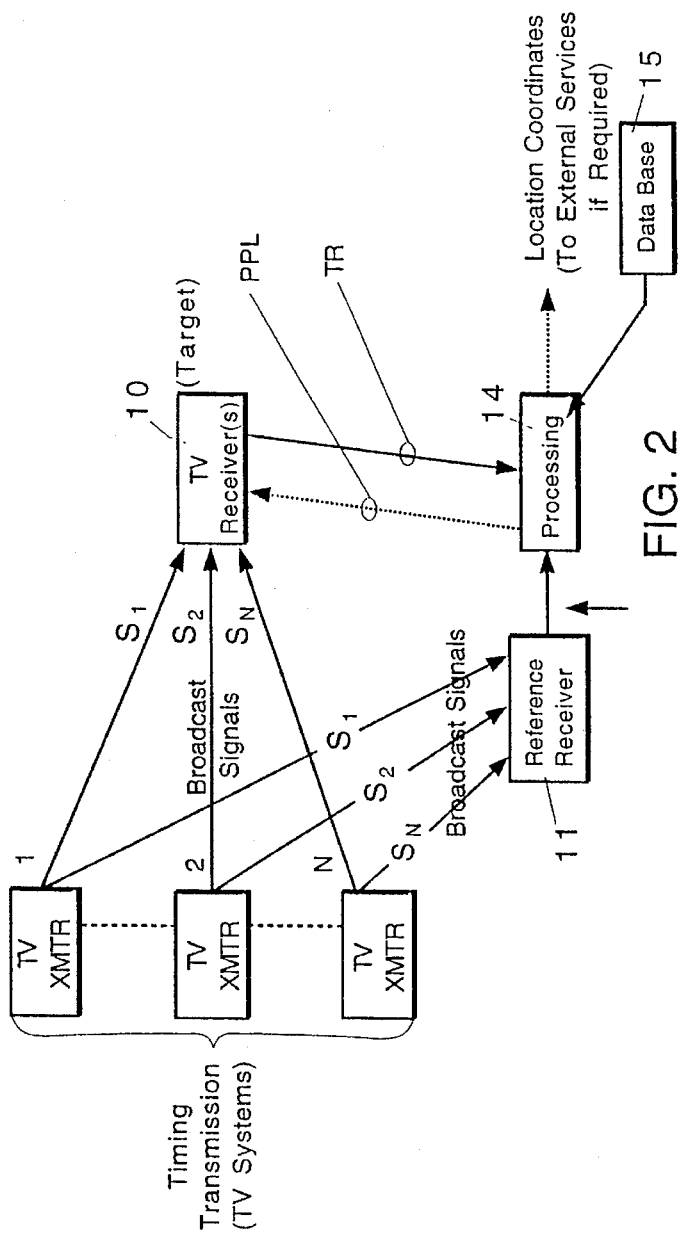
FIG. 2 is a diagrammatic illustration of the distribution of reference, measurement and processing functions for the TV positioning system according to the invention.

The computation of the Target Receiver's 10 location can be accomplished at several locations in the system depending on the application. FIG. 2 shows a functional block diagram of the system incorporating the processing function with the communication function implicit by the connectivity. For this discussion, it will be assumed that the processing is accomplished at the Target Receiver 10 (even though later embodiments will show that this not a requirement).

Reference Receiver 11 supplies processor 14 with the following:

Timing relationship between TV signals relative to the reference receiver (or a reference TV station);

Rate of change in the timing relationship between TV signals relative to the reference receiver (or a referenced TV station);

TV station list (optional).

Processor 14 incorporates a data base 15, which provides:

Coordinates of each TV station;

Coordinates of reference receiver;

Coordinate system reference;

Map/location data base.

The processor 14 utilizes the following data to compute location:

1. Target Receiver measurement data describing the time of arrival of each television signal (or the time difference of arrival of each television signal relative to another signal), 2. The Reference Receiver's correction data describing the time difference in transmission of each TV signal and the rate of change of transmission time of each signal, 3) The speed of radio wave propagation, and 4) Coordinates (location) of the TV stations used in the measurements.

With the first two sets of information, the processor can determine the length of time it took each signal to arrive at the Target Receiver. With the third piece of information, the length of time travel can be converted to distance traveled for each signal. This information, coupled with the origin of each signal (4th set of data), permits a geometric location solution to be determined.

Figure 3:
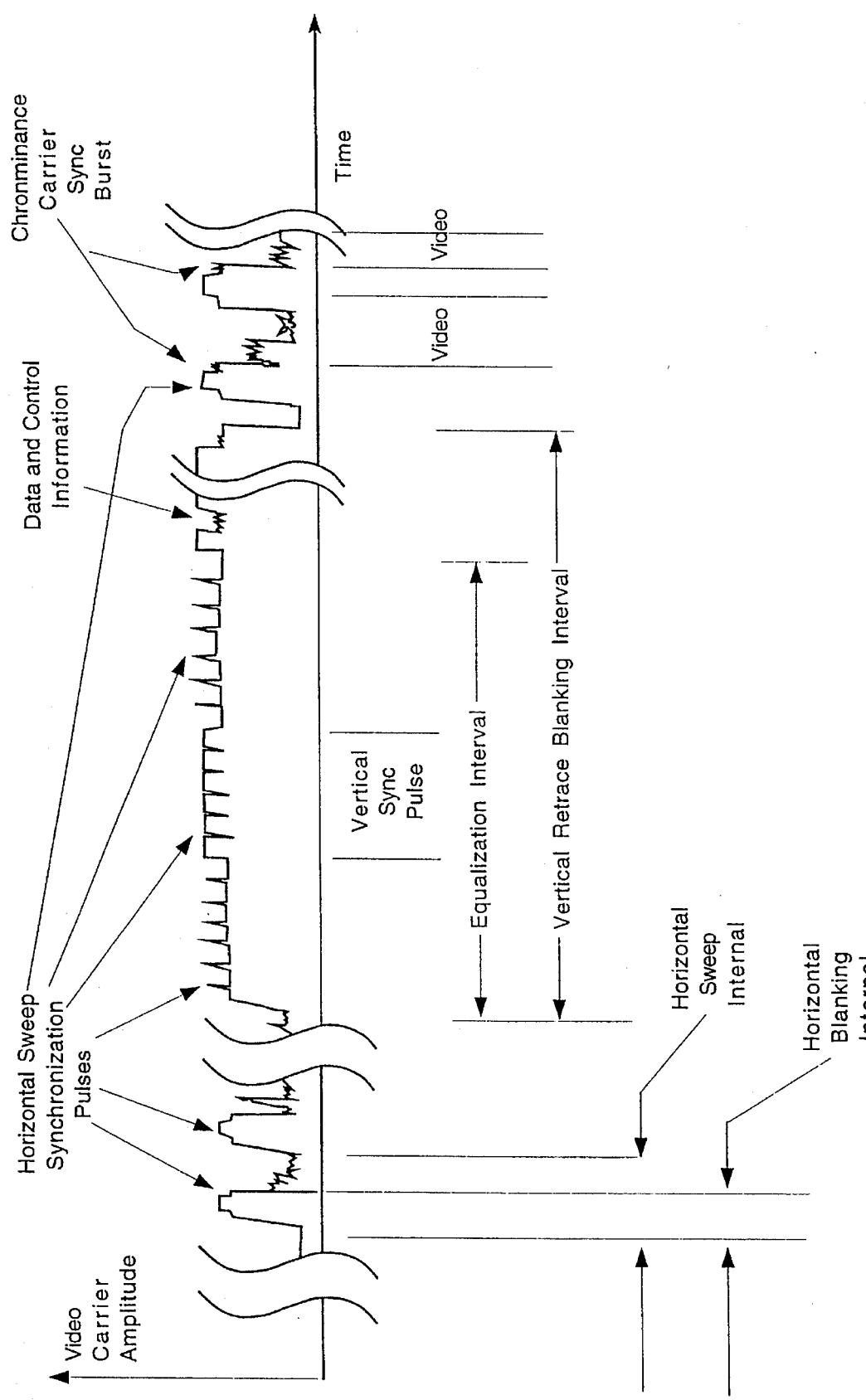
FIG. 3 is a diagrammatic illustration of a typical baseband video signal amplitude modulated.

FIG. 3 shows the baseband TV video signal. This signal is Amplitude Modulated on the video carrier and subsequently filtered to produce Vestigial Sideband Modulation. The video diagram shown in FIG. 3 shows several key components of the signal highly useful for extracting timing information applicable to location determination according to the invention. All timing reference signals are derived from the Chrominance Subcarrier (color sync burst) of 3.579545 MHz. A minimum of eight(8) cycles of this reference are transmitted many times each TV frame. Therefore the measurement receiver has access to this station reference. The Vertical Sync Pulse is sent 59.94 times a second (3.579545 MHz× 4/(455×525). A Horizontal Sync Pulse is sent 15,734 times a second (3.579545 MHz×2/455). Therefore, the TV vertical frame interval (time between vertical sync pulses) of 16,683+microseconds is further subdivided by the Horizontal Pulse Interval of 63.55 microseconds, and can be further subdivided by the Color Sync Burst interval of 279 nanoseconds. These time intervals represent distance resolutions of 3128 miles, 11.9 miles, and 276 feet respectively. Since it is possible to further resolve each cycle of the Color Sync Burst to within a few degrees, a resolution to within a few feet is possible and is the most preferred embodiment.

Because vertical sync frames can vary in length due to the fact that different stations can have Color Sync Burst frequencies that vary +/−10 Hz (and therefore the frames appear to drift relative to each other), the maximum drift of one frame relative to another results in a change in location of 92 feet per second due to the frequency offset. Since the Reference Receiver 11 also knows the frequency error, and the error information is communicated to the processor, the drift error can be reduced or eliminated by the processor computing the location.

Additionally, any TV station can have its reference frequency change by 0.1 Hz per second. This results in a maximum uncertainty of 0.9 feet times the number of seconds squared ($t^2$) of operation without an update from the reference station 11. Assuming that the time from a Reference Receiver 11 measurement to Target Receiver 10 update is ten (10) seconds, a maximum location error of approximately 92 feet would result due to the frequency rate of change.

Example System Implementations

The following examples are illustrative embodiments of the kinds of specific implementations that can be utilized to realize a TV location determination system according to this invention. The embodiments shown are only a small fraction of the implementations can be utilized and are not meant to limit the scope of the concept of utilizing TV signals for the purpose of location determination.

Example 1: Location Determination at a centralized or common location

Figure 4:
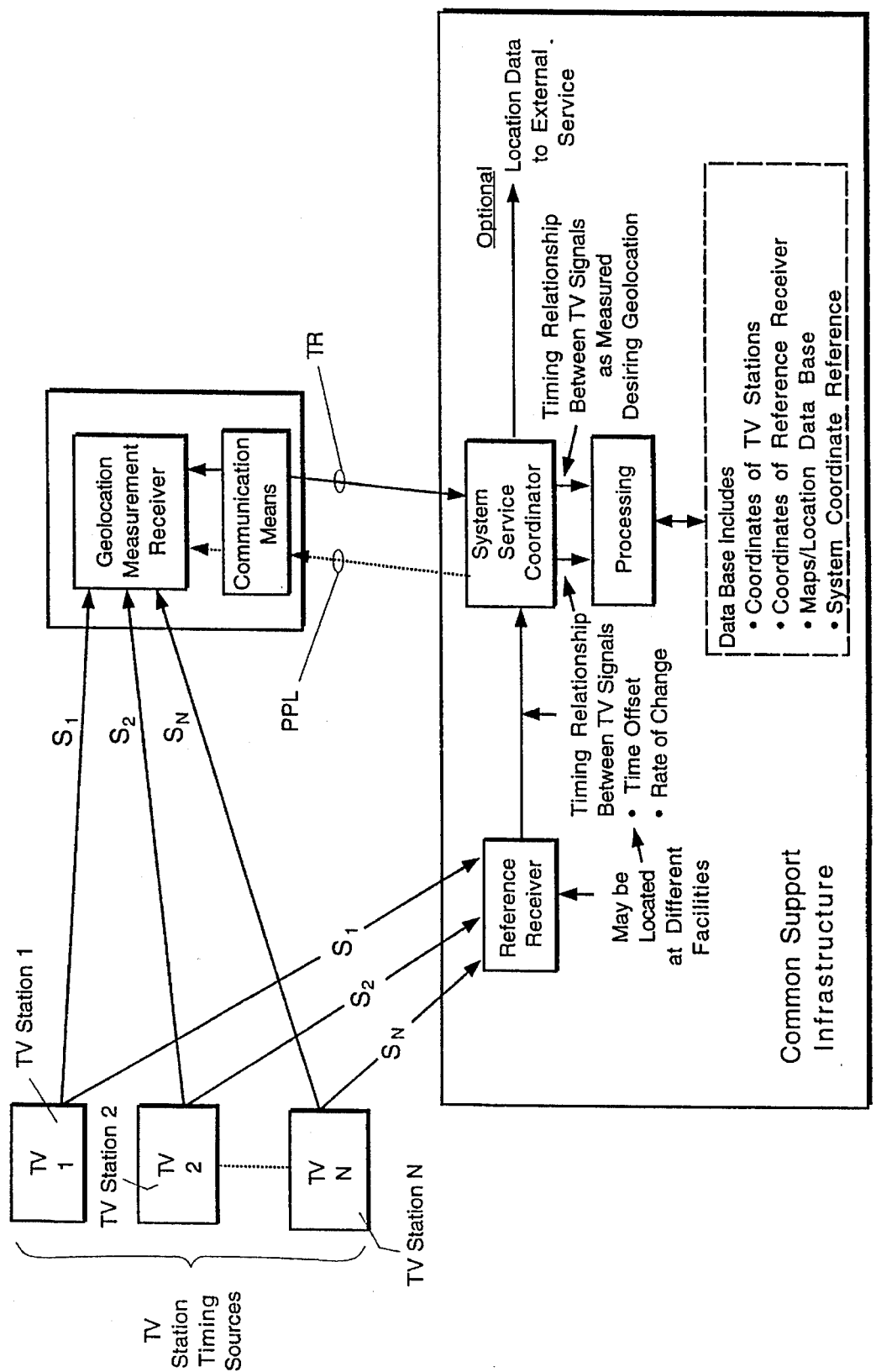
FIG. 4 is a general block diagram of one preferred embodiment of the invention in which positioning is computed at one or more centralized locations.

FIG. 4 shows an implementation of the invention wherein the Reference Receiver Measurements, Reference Receiver Processing and Location Determination Processing are accomplished at a common location or service center. The Target Receiver communicates with the service center providing the Target Receiver measurement data. The service center then uses its stored knowledge of the TV stations' offsets and drift rates, physical locations, Target Receiver time differences, and the velocity of propagation to calculate the Target Receiver's position. If desired, the position data is then relayed back to the Target Receiver.

The principle advantage of this implementation is that a minimum of processing is required at the Target Receiver. Target Receiver simplification can be further accomplished by having the service center communicate the TV station list to the Target Receiver so that long term (non-volatile) memory of the list is not required. Therefore, with this system configuration, with the exception of Target Receiver measurements, the burden of location determination is with the service center. This system configuration is especially advantageous if the location information is primarily needed by the service center as would be the case in dispatched vehicle tracking.

Example 2: Location Determination processing at the Target Receiver

Figure 5:
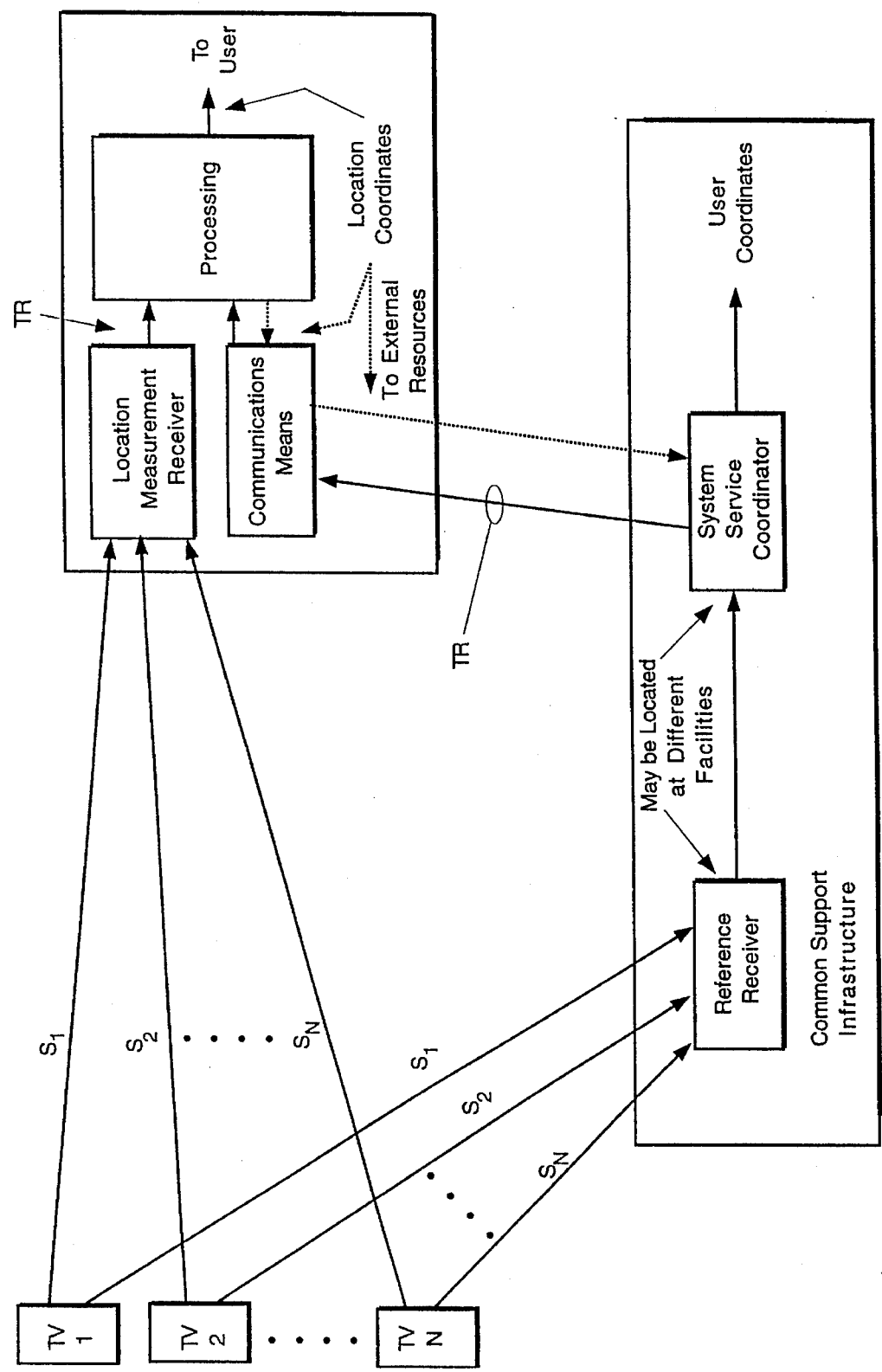
FIG. 5 is a general block diagram of a second preferred embodiment of the invention in which positioning is computed at the unit desiring location determination.

FIG. 5 shows the system configuration and functions in an embodiment that provides the location determination processing at the Target Receiver. As in the prior embodiment, the Reference Receiver measurements and TV station characterization data processing are accomplished at a facility common to all locations determination users. These correction data are provided to those Target Receivers desiring location determination. Optionally, such information as the TV station list, coordinates of the TV stations, etc. can be communicated if not already available to the Target Receiver. The Target Receiver's Processor then utilizes the known data and measurements to compute its location.

The principle advantage of this configuration is that the burden of location determination is distributed to the users. This can be a large advantage if the number of users is large, and the location information is required primarily at the Target Receiver (user).

Example 3: A Configuration with Minimized Service Center Responsibilities

FIG. 3 illustrates the TV baseband signal depicting the various waveform elements. Also shown in that figure is the Vertical Blanking Interval (the period of time in which the signal directs the TV set to change its horizontal sweeping from the bottom of the picture to the top of the picture-also known as vertical retrace). A specific Vertical Sync Pulse is also sent during the vertical retrace to precisely synchronize the TV set's vertical sweep. Horizontal sweep synchronization pulses are also sent during this vertical retrace time to maintain the TV set's horizontal sweep synchronization. Since the TV set is blanked (set to "black") during this interval, no picture information (video) is sent between the Horizontal Sync pulses. The time can be used however to send data and information since the transmission will have no effect on the picture content. Therefore, TV test data and instructions can be sent between the studio and TV transmission facilities, and "closed captioning" data can be transmitted to properly equipped TV sets for the hearing disadvantaged. It is therefore also feasible that the Reference Receiver correction data could be sent by this means eliminating a separate communication means for the Location Determination system.

Figure 6:
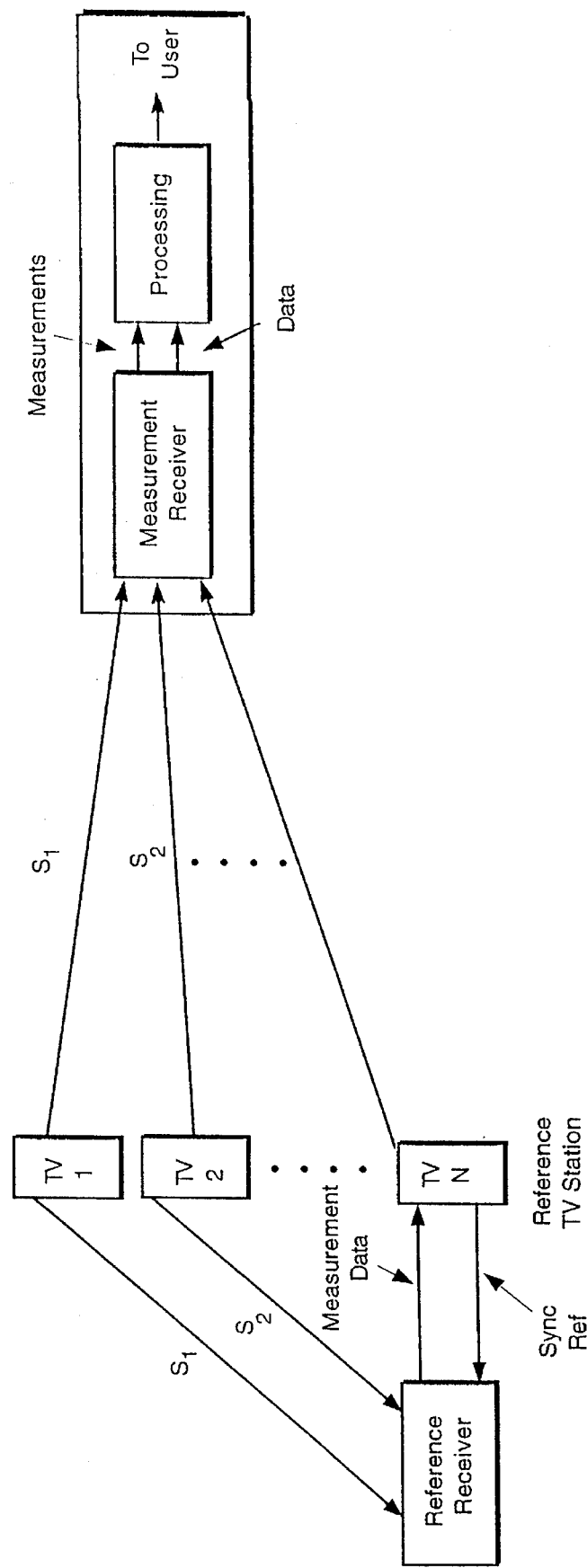
FIG. 6 is a general block diagram of a third preferred embodiment of the invention in which at least one of the TV stations serves as a reference station.

FIG. 6 depicts a TV Location Determination system that employs the Vertical Retrace period for data transmission of the Reference Receiver's correction data. The Reference Receiver receives the signals from all the candidate TV stations, and determines the time offset and rate of drift for each station. These data (or a processed version of the data) are transmitted by one of the TV stations during the vertical retrace interval so that correction data is available to all Target Receivers. If not already known by the Target Receivers, the list of candidate TV stations and their geographic coordinates can also be sent by the TV station. The Target receiver processes these data and the measurement data to calculate its location.

This embodiment is especially applicable if a system operation is required that is independent of all other communication means.

Figure 7:
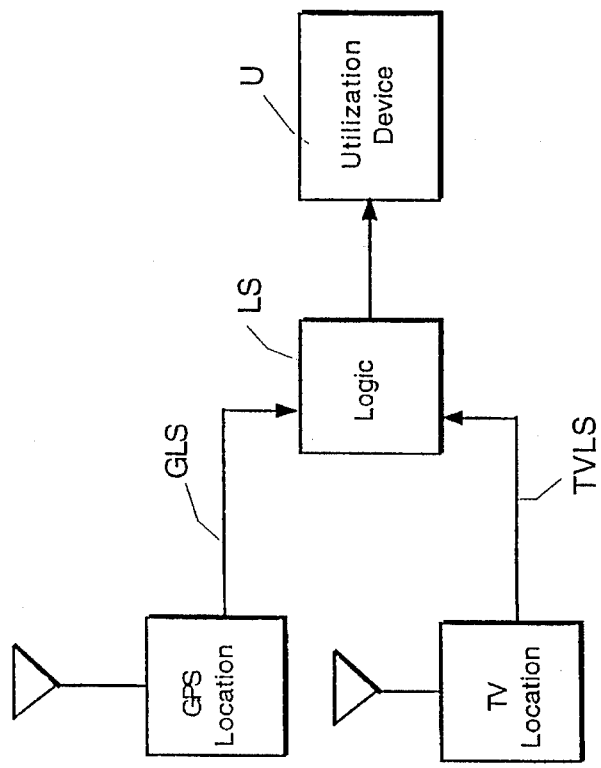
FIG. 7 is an illustration of the invention combined with a GPS position locating receiver and a logic system for selecting the most reliable location signals.

FIG. 7 is a block diagram of a further embodiment of the invention wherein the television location signals TVLS are provided in parallel with a conventional Global Positioning System (GPS) Location Signals GLS to a Logic System LS. In areas where either the television signal may not be sufficient, as in remote, low population density areas, or where GPS satellite signals may be blocked, as in urban canyon or dense forests, the logic system LS selects the most reliable location signals and presents them to the utilization device U, which may be a display device, for example.

While preferred embodiment of the invention have been shown an described, it will be appreciated that other embodiments of the invention will be obvious to those skilled in the art and such other embodiments are encompassed by the claims appended hereto.

What is claimed is:

1. A location determination system in which mobile units are in an area of at least three geographically fixed commercial television stations, each of which broadcasts television signals having horizontal sync, vertical sync and chrominance carrier burst sync signals, comprising, each mobile unit includes television receiver means including detection means for receiving television signals from a predetermined number of said television stations and measuring the times of arrival of at least one of said sync signals of each of said predetermined number of said television stations, respectively, and producing mobile unit signals corresponding thereto, a geographically fixed reference station having means for storing the frequency and geographic positions of said plurality of geographically fixed commercial television stations, means for receiving said television signals and measuring frequency and wavelength drift in said television signals from each of said geographically fixed television stations, respectively, and producing reference receiver correction signals corresponding thereto, and location determining means for receiving said mobile unit signals and said referenced receiver correction signals and determining the respective location of each said mobile units therefrom.

2. The location determination system defined in claim 1 wherein said at least one of said signals is said chrominance carrier sync burst signal and said detection means includes means to determine the phase change of said chrominance carrier sync burst signal.

3. The location determination system defined in claim 1 wherein said geographically fixed reference station is located at one of said commercial television stations, said one of said commercial televising stations sync signals having a vertical retrace blanking interval and said reference receiver correction signals are sent by said one of said commercial television station during said vertical retrace blanking interval to said mobile units.

4. The location determination system defined in claim 1 wherein said detection means includes means for extracting timing information from said sync signals for each station in said predetermined number of said television stations.

5. The location determination system defined in claim 1 including a communication link between said reference station and each of said mobile units.

6. The location determination system defined in claim 5 wherein said reference station is located at one of said television stations and said communication link is included in the television signals transmitted at said one of said television stations.

7. The location determination system defined in claim 1 wherein said reference station includes means to:
 a) measure the time difference of arrival of said sync signals of each one of said television stations,
 b) measure the rate of change of the time difference of arrival, and
 c) provide these data to said mobile units desiring location determination.

8. A method of determining position of a mobile receiver within a geographical area having a plurality of commercial television (TV) broadcast stations and wherein the mobile receiver from time-to-time is in a building or other obstructed environment, comprising:
 providing said mobile receiver with means for receiving said plurality of commercial television (TV) broadcast signals having synchronizing signals therein, and detecting the relative times of arrival of said TV broadcast signals and producing mobile receiver signals corresponding thereto,
 receiving said TV broadcast signals at a geographically fixed reference station having stored thereat the geographic positions of said plurality of commercial TV broadcast stations and measuring the wavelength drift of each of said TV broadcast signals and producing reference receiver correction signals corresponding thereto, and
 determining the location of said mobile receiver from said mobile receiver signals and said reference receiver correction signals, including when said mobile receiver is in a building.

9. A method of determining position of a mobile GPS receiver within a geographical area wherein the mobile GPS receiver from time-to-time is in a building or other obstructed environment, said mobile GPS receiver producing a GPS location signal, comprising:
 providing said mobile GPS receiver with means for receiving a plurality of commercial television (TV) broadcast signals having synchronizing signals therein, and detecting the relative times of arrival of said TV broadcast signals and producing mobile receiver TV location signal corresponding thereto, and
 logic means for selecting one of said GPS and TV location signals for presentation to a utilization device.

10. The method defined in claim 9 including using said GPS locations signal to resolve ambiguity in said TV location signal.

11. A location finding navigation system for operating in an environment of GPS satellite signals and commercial television (TV) broadcast signals, comprising:
 first receiver means for receiving a predetermined number of GPS satellite signals and producing a GPS location signal,
 second receiver means for receiving a predetermined number of said TV broadcast signals and producing a TV location signal, and
 logic means connected to receive said location signal and selecting one of said location signals and presenting the selected location signal to a utilization device.

* * * * *